United States Patent [19]
Fukusaki et al.

[11] Patent Number: 5,493,578
[45] Date of Patent: Feb. 20, 1996

[54] ASH MELTING FURNACE

[75] Inventors: Minoru Fukusaki, Nagareyama; Hitoshi Hagihara, Tokyo; Satoshi Inoue, Asaka, all of Japan

[73] Assignee: Ishikawajima-Harima Heavy Industries Co., Ltd., Tokyo, Japan

[21] Appl. No.: 124,913

[22] Filed: Sep. 21, 1993

[30] Foreign Application Priority Data

Sep. 24, 1992 [JP] Japan .................................. 4-254954

[51] Int. Cl.$^6$ ................................................. F27D 17/00
[52] U.S. Cl. .................. 373/8; 373/18; 373/25; 110/165 R
[58] Field of Search ............... 373/8, 9, 18, 19, 373/22, 24, 25; 219/121.11, 121.54; 110/246, 248, 259, 216, 346, 165 R, 171

[56] References Cited

U.S. PATENT DOCUMENTS

| | | | |
|---|---|---|---|
| 4,048,927 | 9/1977 | Augustin et al. | 110/8 R |
| 4,141,694 | 2/1979 | Camacho | 373/80 |
| 4,328,019 | 5/1982 | Dejaiffe et al. | 65/19 |
| 4,492,594 | 1/1985 | Curley | 65/134 |
| 5,042,399 | 8/1991 | Motomura et al. | 110/165 R |
| 5,081,940 | 1/1992 | Motomura et al. | 110/346 |
| 5,188,043 | 2/1993 | Trepaud | 110/346 |
| 5,259,863 | 11/1993 | Schneider et al. | 75/414 |
| 5,320,050 | 6/1994 | Ishida et al. | 110/165 R |

FOREIGN PATENT DOCUMENTS

| | | |
|---|---|---|
| 0035850 | 9/1981 | European Pat. Off. . |
| 0209718 | 1/1987 | European Pat. Off. . |
| 2388594 | 11/1978 | France . |
| 2530611 | 1/1984 | France . |
| 1-270990 | of 1989 | Japan . |
| 4-18206 | of 1992 | Japan . |

*Primary Examiner*—Tu Hoang
*Attorney, Agent, or Firm*—Thomas K. Ziegler

[57] ABSTRACT

The ash melting furnace disposes the combustion ash resulted from incineration of municipal or other sorts of waste by melting it utilizing as the main fuel the unburnt carbon contained in the ash itself. The ash melting furnace includes a stationary plasma torch which uses air for the working gas, and which is so placed facing the combustion ash heaped up within the furnace as to project its hot gas jet thereon. The furnace further includes a torch unit controller that actuates the plasma torch to secondarily heat and melt the ash.

8 Claims, 1 Drawing Sheet

ASH MELTING FURNACE

BACKGROUND OF THE INVENTION

1. Technical Field

This invention relates to an ash melting furnace whose main duty is to melt away the ash that has resulted from incineration disposal of municipal and other sorts of wastes.

2. Background Art

Conventionally, most of the wastes such as municipal and industrial are disposed by incineration, and combustion ashes resulted therefrom are buried in the ground. Today, however, this practice has run into two major difficulties: for one, the land to be filled with such ashes is getting scarce, and for the other, the environmental regulations applicable to both incineration and ash-burying are becoming more stringent.

It is for these reasons that methods of making slag out of the ash by melting it at a high temperature and appropriately solidifying are drawing attention to the prospects of achieving volume reduction, rendering the ash non-polluting, and reusing it as a new resource. Thus, there are already a number of plants operating on an ash melting method of one sort or another.

However, the reality is that most of them are suffering from high operation costs because they rely on electricity or oil as the heat source for ash melting: this is one significant factor that is preventing this technology from spreading widely.

To solve this difficulty, a process has been proposed wherein the waste is incinerated in such a way as to leave enough unburnt matter (e.g., unburnt carbon) in the ash and the unburnt carbon is burned upon supplement of combustion air so as to use it as the major fuel (or major heat source) in the ash melting (described in Japanese Patent Application, Second Publication No. 4-18206). An ash melting furnace operating on this principal has demonstrated that a remarkable reduction of operating cost is indeed possible. Thus, this has reduced the necessary amount of electricity and oil used as the main heat source.

However, there remains another problem: because of the variable moisture content and changing quality of the carbonaceous substances in the waste, a property which is rather natural with municipal waste, there can be cases where ash melting becomes imperfect even though the content of the unburnt matter (called "unburnt carbon" hereinafter) is controlled to a prescribed value or range. To counteract this sort of variation, a heating unit, e.g., electric heater, may be provided in the furnace hearth.

Yet unstable melting may take place if such a quality variation occurs too rapidly, or when the combustion in the main incinerator is unsteady. For this contingency, the use of an oil burner or a plasma torch that many ash melting furnaces utilize as the main heat source for ash melting (see, for example, Japanese Patent Application, Laid-Open Publication No. 1-270990) as auxiliary heating means may be a workable solution, but then it must be done without incurring an excessive rise in the system operation cost.

SUMMARY OF THE INVENTION

One purpose of this invention is to provide an ash melting furnace that is capable of stably performing the ash melting utilizing, as the major melting source, the unburnt carbon that has been intentionally left over in the combustion ash resulting from incineration deposal of various sorts of waste.

Another purpose of this inventions is to prevent the operation cost of such an ash melting furnace from becoming excessively high.

According to one aspect of the present invention, there Is provided an ash melting furnace that utilizes the unburnt carbon as the major fuel of ash melting, comprising a stationary plasma torch placed to face a combustion ash heaped up within an ash melting furnace body for injecting air as a high temperature gas and a controller module for actuating the plasma torch as an auxiliary melting heat source when an ash molten state has become unstable.

The plasma torch heats the combustion ash in the furnace body by directing a jet of air heated to a high temperature by the DC arc struck between its pair of electrodes, thereby utilizing the unburnt carbon even more effectively. The plasma torch controller module may include a detector to assess the state of molten ash and a plasma torch controller that operates the torch based on the data the molten ash detector feeds back. Here, the molten state detector may include a first sensor that measures the temperature of the combustion gas in the furnace (exhaust gas), a second sensor that determines the temperature of the molten ash as it flows out of the ash melting furnace, and a third sensor, which can be an imaging camera, that collects the image information on the ash molten state. The controller module may then be constructed in such a way, whenever one or more of the measurements these sensors is feeding back has been found to fall short of the respectively preset control value, as to let the torch controller drive the torch with an electric power in accordance with the difference between the preset control value and the measurement.

The plasma torch may be deployed approximately parallel to the hearth of the ash melting furnace so as to direct its hot air jet to the upper portion of the ash heap. This arrangement melts up the ash without damaging the furnace hearth.

The ash melting furnace may comprise an inclined hearth, a plurality of grate plates placed on the hearth, an electric heater built in each grate plate and a number of nozzles to inject hot combustion air into the furnace. Also, the furnace may be equipped with a weir to subdivide the furnace body into the ash packing zone, where the incoming incinerator combustion ash is heaped up, the ash combustion zone, where the unburnt carbon is kindled by the combustion air supplied from below, and the ash melting zone, where the ash is melted on the combustion heat thus generated. The plasma torch may preferably be placed so as to project its hot air jet to the top portion of the ash heap as it has entered the combustion zone.

DETAILED DESCRIPTION OF THE PREFERRED EMBODIMENTS

Now we shall disclose our invention by referring to the attached drawings which show a preferred embodiment.

Figure 1:
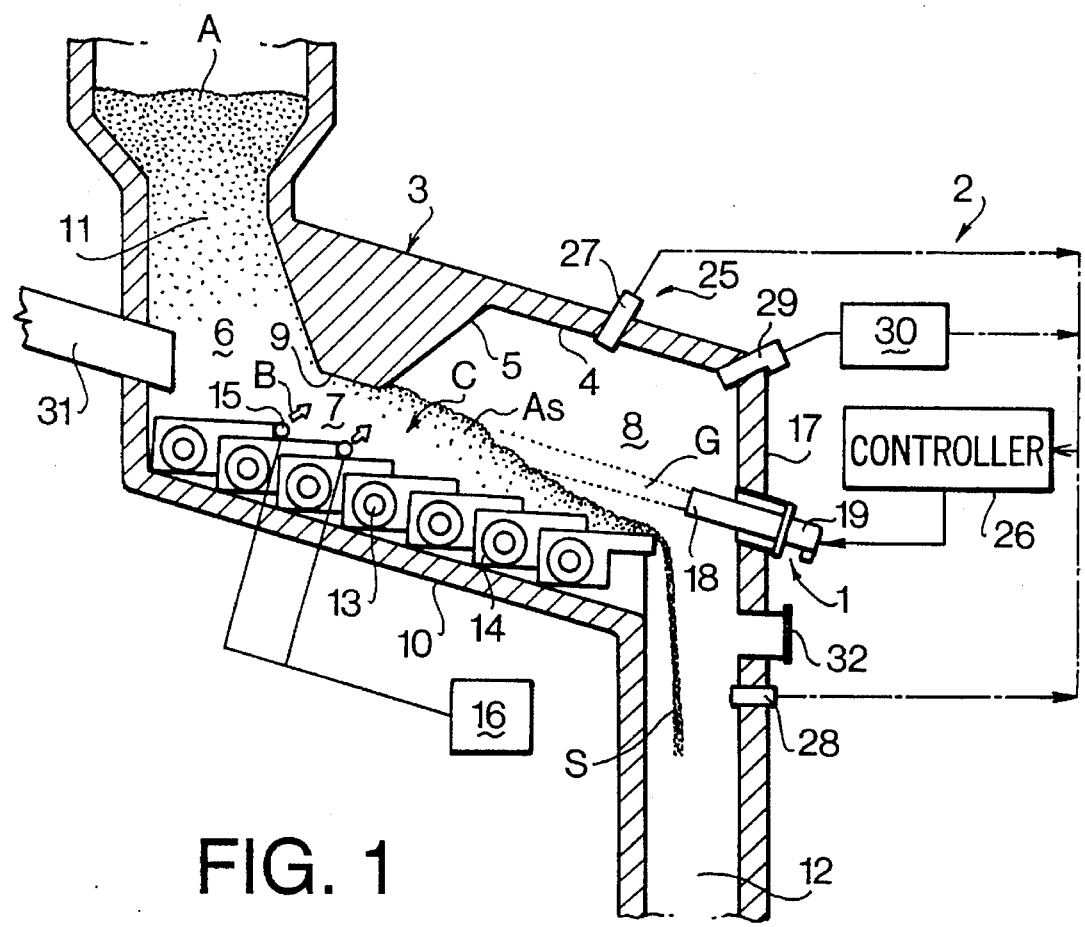
FIG. 1 is a sectional view of an ash melting furnace showing one embodiment of this invention.

First referring to FIG. 1, illustrated is an ash melting furnace that disposes away the combustion ash A resulting from incineration of municipal or other sorts of waste by melting with the unburnt carbon C, which has been intentionally left over in the ash as the major heat source. The ash melting furnace includes a plasma torch 1, which is arranged so as to face the heap of the combustion ash As, and the controller module 2 for actuating the plasma torch 1 when the melting state of ash As has been found unsatisfactory.

A furnace body 3, which may be made of a castable refractory, is inclined slightly so as to promote the unidirectional movement of the combustion ash A, aided by the pusher 31, towards a discharge duct 12. The ash A is charged from an incinerator (e.g., stoker type one, not shown) into the furnace body 3 through a vertical charge duct 11. Extending from the furnace top wall 4 downwards, we provide a weir 5 of inverse truncated trapezoid In cross section so as to subdivide the furnace body into three zones: an ash packing zone 6 upstream, an ash melting zone 8 downstream, and an ash combustion zone 7 in between. Here, we locate the weir 5 about one third way from the upstream end along the furnace, and the clearance between its bottom end 9 and the furnace bottom wall 10 is about one half of that of the ash melting zone 8, thereby defining the ash combustion zone 7. The ash melting zone 8 ends in a molten slag discharge duct 12, through which the molten slag S falls into a slag ladle (not shown).

On the hearth 10 which extends through the zones 6, 7, 8, there are a number of grate plates 14 mounted in a stepwise fashion, covering the hearth 10 essentially entirely. The grate plate 14 is made of silicon carbide, and each plate 14 has a built-in, rod-form electric heater 13 made also of silicon carbide (the use of other materials is also allowed If selected appropriately).

Here, the primary function of the heater 13 is to heat the grate plate 14 from within so as to heat the ash heap As residing in the combustion zone 7 to its ignition point by the heat it radiates out of the grate plate 14's upper surface, while its secondary function is to preheat to a high temperature the ash heap A waiting in the packing zone 6 to be kindled in the combustion zone 7 as well as to prevent the molten slag S formed in the melting zone 8 from solidifying while residing in the furnace body 3. The preheating contributes to the promotion of burning and melting. To serve these purposes, preferably the heating temperature of the heaters 13 is controlled to be higher as going downstream, for example, 1,100° C., 1300° C., then 1,350° C. as going from the zone 6 to the zone 7, and then on to the zone 8.

In addition, we provide an air nozzle 15 to each step the two adjacent grate plates 14 make in the packing zone 6 and In the combustion zone 7. We blow hot combustion air of about 500° C. upwards, as indicated by the arrows B, from a combustion air source 16 (which includes an air heater and a compressor) through the nozzles 15. Here again, we control the supply of the combustion air B so as to develop an optimum combustion-and-melting condition by holding, for example, the feed air pressure to the combustion zone 7 appropriately higher than elsewhere.

We set the plasma torch 1 on the furnace's end wall 17 (downstream end of the melting zone 8) with its nozzle mouth 18 pointing upstream and with the torch casing 19 lying parallel to the hearth 10 (accordingly, the torch casing 19 is slightly included upward): we deploy it in such a way that the hot gas G it jets out will penetrate the top portion of the ash heap As in the melting zone 8.

Figure 2:
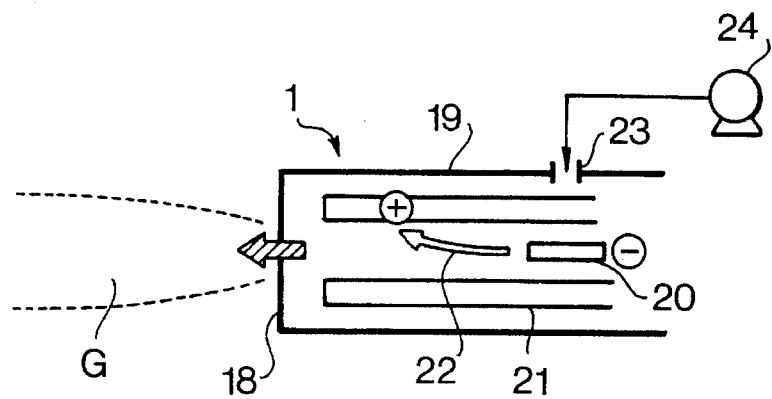
FIG. 2 shows a schematic cross section of the plasma torch of FIG. 1.

The plasma torch 1 is a stationary type, as shown in FIG. 2, and its output power is for example, 80 to 290 kW. Specifically, in the casing 19, which is the torch body, there is provided a rod cathode 20 made of tungsten and a nozzle anode 21 made of copper. A DC arc 22 is struck between the two electrodes when electric power is fed. The air, which acts as the working gas, is taken in through an inlet port 23 swirling as fed by the blower 24. It is heated to a very high temperature (e.g., 4,000° to 5,000° C.) by the DC arc 22 and is let out from the nozzle mouth 18.

The torch unit controller module 2 includes a molten state detector 25, which assesses the melting state of ash, and a torch controller 26, which actuates the plasma torch 1 in accordance with the data the molten state detector 25 feeds back.

The molten state detector 25 has a first sensor 27, which determines the temperature of the furnace combustion gas (exhaust gas), a second sensor 28, which takes measurements of the temperature of the molten slag S as it flows out of the furnace, and a third sensor 29, which is an imaging camera that visually analyzes the state of molten ash. Here, we place the first sensor 27 on the top wall 4 and downstream of the weir 5 so as to detect the temperature of the furnace gas as it is generated on combustion and melting of the ash As. The second sensor 28 is placed on the end wall 17 so as to measure the temperature of the falling slag S, and the third sensor 29 is placed at the corner of the top wall 4 and the end wall 17, so as to feed the ash molten state as image information to the torch controller 26 via the image processor 30. In the meantime, the torch controller 26, which has been input with a set of predetermination control values for the gas temperature, the ash temperature, and the image information (e.g., color tone, brightness, etc.) that represent the desirable ash molten state, compares the incoming signals with theses preset values, and judges the molten state as unstable whenever the measured values have exceeded or fallen short of the preset value or value range, thereon to regulate the power to be feed to the plasma torch 1 accordingly.

Finally, we provide a pusher 31 to pack and push the incoming combustion ash A downstream way through the packing zone 6, and a gas uptake 32 to draw the furnace combustion gas out of the furnace body 3.

Next, the operation of this embodiment will be described.

The ash A that has resulted from incineration of municipal or other sorts of waste is charged into the ash melting furnace 3 through the charging duct 11, containing a predetermined amount of unburnt carbon C to some 15% by mass. The ash A that has now entered the combustion zone 7 through the packing zone 6 is burnt with its own unburnt carbon C as the main fuel the combustion air B which the air nozzles 15 blow thereinto, and is heated up to its melting point by the combined heat of its own and that of the electric heaters 13 and the combustion air B brought in.

The melting of ash is done mostly in the melting zone 8, and as the ash A is shifted downstream to the end of the row of the grate plates 14, a stream of molten slag S is formed to fall through the molten slag discharge duct 12 into the slag ladle.

If the waste contain s a large quantity of moisture or incombustible matters, however, cases of imperfect ash melting or untimely solidification and deposition of the once melted ash would occur even when the content of the unburnt carbon C is sufficient, because the auxiliary heat derived from the electric heaters 13 and the hot combustion air B from the air nozzles 15 is insufficient. Much the same sort of situation occurs when the unburnt carbon C becomes deficient intermittently.

It is in such a case as this that the torch unit controller 2 comes into play: the ash molten state detector 25, which includes two temperature sensors 27 and 28 and a video camera 29, detects the anomaly in terms respectively of gas temperature, slag temperature, and color tonal change and other visual signal of the melting ash heap As. The detection data are supplied to the torch controller 26, and the torch controller 26 actuates the plasma torch 1 with electric power which is regulated in accordance with the detected discrepancy when one or more of these measurements fall short of the respectively preset control value. Upon application of the electric power, the plasma torch 1 immediately injects the hot gas G toward the ash heap As to raise the temperature of the ash head As to its melting temperature. It will be understood here that inasmuch as the ash heap As has already been heated to or near the melting temperature, e.g., Owing to the provision of the weir 5 that works as a throat for subdividing the furnace body 3 into the ash packing zone 6, the ash combustion zone 7 and the ash melting zone 8, the speed of the combustion gas the ash As generates on combustion is effectively increased as the furnace body 3 is throttled, thereby raising the heat density (i. e., the heat generation load) to promote the ash melting further.

We have tested this invention with an ash melting furnace that has been modified to accord with the above described embodiment. Table I summarizes the results we have obtained.

TABLE I

| STATE OF OPERATION | NORMAL | | DEFICIENT C | |
|---|---|---|---|---|
| ASH IGNITION LOSS % | 40% | | 25% | |
| USE OF PLASMA TORCH | NO | YES | NO | YES |
| PLASMA OUTPUT, kW | — | 120 ± 10 | — | 120 ± 10 |
| ASH MELTING RATE, kg/h | 150 ± 20 | | 150 + 20 | |
| COMBUSTION FLOW RATE, Nm³/h | 950 ± 50 | | 700 ± 50 | |
| AIR TEMPERATURE °C. | 450 ± 50 | | 450 ± 50 | |
| GAS TEMPERATURE, °C. | 1300 ± 30 | 1380 ± 30 | 1100 ± 30 | 1230 ± 30 |
| SLAG TEMPERATURE, °C. | 1300 ± 30 | 1450 ± 30 | * | 1270 ± 30 |

*Slag solidified to 1,200° C. or thereabout, heating of the plasma torch 1 to a rise of no more than about 100° C. will suffice. It is to be appreciated also that since the hot gas G the plasma torch 1 jets out is air, which contain oxygen, combustion of the unburnt carbon C to melt the ash heap As is promoted at its top portion where the air B as blown upwards by the air nozzles 15 do not penetrate well enough.

Upon heating operation of the plasma torch 1 and substantial air feeding, the melting state is improved to an almost perfect state. Then, the operation of the plasma torch 1 is ceased on the command of the torch unit controller 2 as soon as all of its sensors 26, 27, and 28 has reported the improvement of the ash melting state to normalcy.

Owing to the actuation of the plasma torch 1 as auxiliary means for heating the ash As under control of the torch unit controller 2, the occurrence of improper melting of the ash is effectively dealt with so as to restore the ash melting state to normalcy, thereby ensuring the continuance of stable ash melting.

Further, inasmuch as the plasma torch 1 is operated only when the temperature of the ash As is lowered slightly from its melting point (i.e., the ash heap As is already heated to a considerably high temperature), the operation of the plasma torch 1 needs to last only for a very short while, thereby limiting the power consumption to a bare minimum.

Since the hot air jet G from the plasma torch 1 is directed to the top portion of the ash heap As, the unburnt carbon C remaining there unaccessed by the combustion air B is utilized effectively as an important fuel, thereby promoting the combustion and melting of the ash As and preventing the operation cost from becoming excessively high.

Since the plasma torch 1 is placed in parallel to the furnace hearth, not only the whole of the ash heap As is heated but the grate plates 14 are protected from the direct hit of the hot air jet G.

The use of air as the working gas for the plasma torch 1, rather than more conventional gases such as argon and nitrogen, not only ensures low cost operation but gives rises to significant freedom in system designing. For example, the air may be branched from a compressor provided for the air nozzles (not shown), thereby eliminating the blower 24.

As may be seen in Table I, particular attention was paid to the temperatures of the furnace combustion gas and the falling molten slag in the case of normal operation (an ash of ignition loss 40%, of which the unburnt carbon C is 15%) and in the case of deficient unburnt carbon (an ash of ignition loss 25%, of which the unburnt carbon C is 10%), each for the effect of the use of the plasma torch 1. We have found that when the unburnt carbon is deficient, the effect of using the plasma torch 1 is to raise both the combustion gas temperature and the outgoing slag temperature to approximately the same level, whereas that in the case of sufficient unburnt carbon is to raise the temperature of the outgoing slag beyond that of the combustion gas.

We consider this observation as due to the enhanced combustion occurring in the ash heap As at its top portion, proving thereby the efficacy of this invention to maintain the ash melting stable.

Finally, It will be understood that the attachment of the plasma torch 1 is not limited to the furnace end wall 17, but setting on the furnace top wall 4 or on the back wall of the molten slag discharge duct 12 is also feasible. In addition, the plasma torch 1 may also be so arranged that it can move along its axial direction, sway and tilt. This makes it possible for the plasma torch to heat the molten slag in the ladle.

We claim:

1. An apparatus for disposing wastes, comprising:
   a furnace for incinerating the wastes, wherein ash is formed upon incineration of the wastes and unburnt carbon is formed upon an incomplete burning of said wastes, the furnace having a hearth;
   means for melting the ash into a slag with unburnt carbon, where the unburnt carbon remains with the ash after the incineration by the furnace, the unburnt carbon being used as a fuel to melt the ash; and,
   a plasma torch directed onto the ash in the furnace and a controller module for actuating the plasma torch, the controller module including
      (1) a molten state detector for determining the state of the ash being melted and generating detection data; and (2) a torch controller connected with the molten state detector for actuating the plasma torch in accordance with the detection data sent from the molten state detector.

2. The apparatus of claim 1, wherein the molten state detector includes:

a first sensor for measuring the temperature of a gas inside the furnace and generating first temperature data;

a second sensor for measuring the temperature of a slag as the slag flows out of the furnace and generating second temperature data, the slag being produced upon melting of the ash in the furnace; and a third sensor for acquiring image data of the ash melting state.

3. The apparatus of claim 2, further including a power source, and wherein when at least one of the first and second temperature data is outside of a predetermined range of temperatures, the torch controller causes the power source to supply power to the plasma torch based on variance of the one temperature data from the predetermined range.

4. The apparatus of claim 3, wherein the plasma torch extends generally parallel to the hearth of the furnace and projects a jet of hot air onto the ash.

5. The apparatus of claim 4, further including at least one of:

a grate placed on the hearth;

a heater built into the grate plate; and a nozzle placed on the grate plate for blowing hot combustion air into the ash on the hearth of the furnace.

6. The apparatus of claim 5, wherein the furnace includes weirs for subdividing the furnace into an ash packing zone where the ash fed into the furnace is packed into an ash heap, an ash combustion zone where the ash is burned with the unburnt carbon remaining in the ash using the combustion air from the nozzle, and an ash melting zone where the ash is melted into the slag.

7. The apparatus of claim 6, wherein the plasma torch is directed to project the hot air to a top portion of the ash heap in the melting zone.

8. A method of disposing wastes in a furnace, comprising the steps of:

A) incinerating the wastes in the furnace wherein ash is produced by the incineration and a certain amount of unburnt carbon is formed upon an incomplete burning of the wastes;

B) melting the ash into a slag using the unburnt carbon remaining in the ash;

C) determining the melting state of the ash being melted; and

D) injecting hot air into the ash when the ash melting state is unstable.

* * * * *